United States Patent [19]

Richter

[11] Patent Number: 4,840,361
[45] Date of Patent: Jun. 20, 1989

[54] HOUSEHOLD BOARD

[75] Inventor: Hans-Jürgen Richter, Bad Soden-Salmünster, Fed. Rep. of Germany

[73] Assignee: Allstar Vergrauchsguter GmbH, Rodgau-Niederroden, Fed. Rep. of Germany

[21] Appl. No.: 157,003

[22] Filed: Feb. 18, 1988

[30] Foreign Application Priority Data

Feb. 18, 1987 [DE] Fed. Rep. of Germany ....... 3705132

[51] Int. Cl.⁴ .............................................. B23Q 3/00
[52] U.S. Cl. .............................................. 269/289 R
[58] Field of Search ............... 269/289 R, 302.1, 15, 269/16, 327, 13; 141/98, 331; D7/43, 409, 46, 47; 15/257.1–257.7

[56] References Cited

U.S. PATENT DOCUMENTS

| D. 238,135 | 12/1975 | Longobardi | 269/289 R |
| 1,251,026 | 12/1917 | Hitchcock | 269/302.1 |
| 3,598,164 | 8/1971 | August . | |
| 4,440,385 | 4/1984 | Kingery . | |

FOREIGN PATENT DOCUMENTS

| 1135133 | 8/1962 | Fed. Rep. of Germany ... | 269/289 R |
| 3677142 | 3/1977 | Fed. Rep. of Germany . | |
| 24279 | 11/1950 | Finland | 269/281 R |
| 2343461 | 11/1977 | France | 269/289 R |
| 251617 | 11/1947 | Switzerland | 269/289 R |
| 259075 | 1/1949 | Switzerland | 269/289 R |

Primary Examiner—Robert C. Watson
Attorney, Agent, or Firm—Fidelman & Wolffe

[57] ABSTRACT

A household board such that the cutting surface of the board is slightly sloped starting from the edge bordering the juice channel to the juice channel disposed on the opposite edge of the board, and that the side of the board opposite the cutting surface is divided by means of projecting ribs into chambers forming working trays.

5 Claims, 3 Drawing Sheets

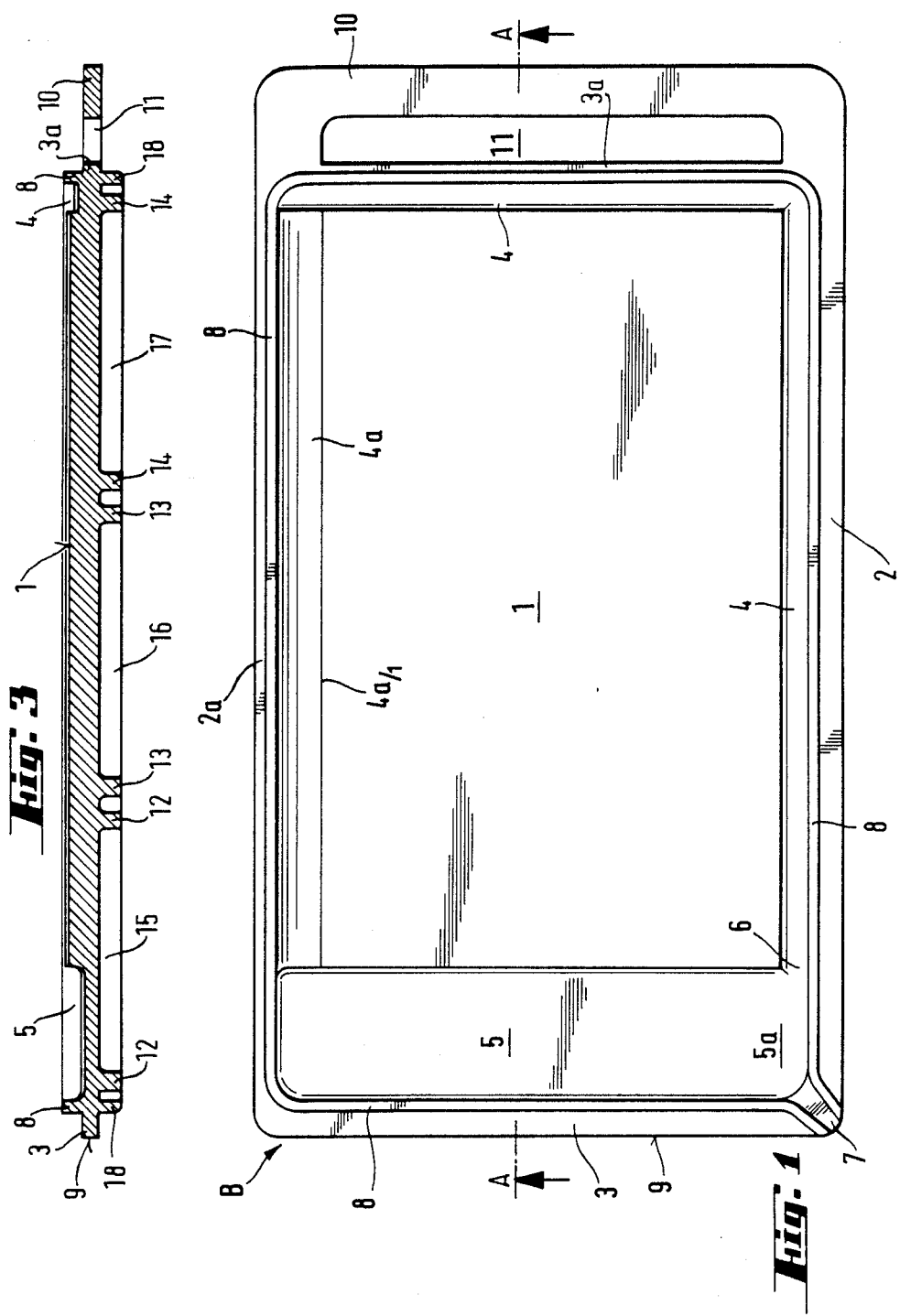

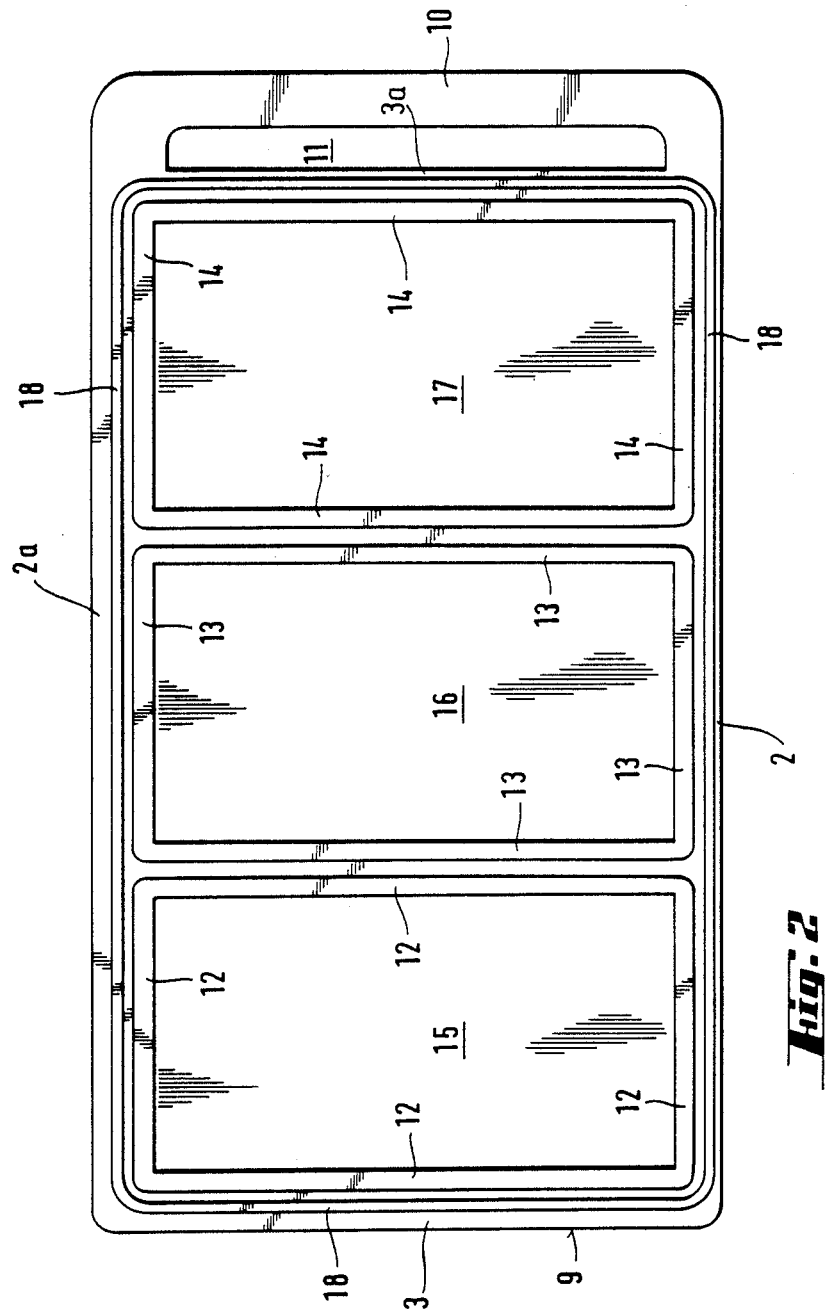

HOUSEHOLD BOARD

DESCRIPTION

The invention relates to a household board with a cutting surface and with an all-around juice channel along its periphery.

Household boards of this type, made of wood or plastic, exhibit two parallel wide sides, one of which is provided with a juice channel disposed along the peripheral edge. Such a household board is to be used only as a cutting board and, in general, adequate use cannot be made of the juice channel.

The problem of the invention is to create a household board of the abovementioned type which is suitable both as a cutting board and as a working and serving board and with which the juice arising during the cutting of a roast can for the most part be completely collected.

This problem is solved by a household board of the abovementioned type such that the cutting surface of the board is slightly sloped starting from the edge bordering the juice channel to the juice channel disposed on the opposite edge of the board, and that the side of the board opposite the cutting surface is divided by means of projecting ribs into chambers forming working trays.

Appropriate further developments of the household board are characterized in the subclaims.

Because of the special shape and resulting full use of its wide sides, such a household board has diverse uses and is extremely practical to handle. The sloped cutting surface ensures that the juice that runs out when a roast is being cut flows down along the slope and into the juice channel, which here is suitably deeper than on the opposite edge of the board. But on the latter edge there is also a juice channel, which may be formed merely as a small depression, since not much juice is collected there. The juice channel empties into a larger juice-collection chamber in which the juice collects and from which it can be poured out. The side of the board opposite the cutting surface is also formed so as to be usable as a working surface, it being divided by means of ribs into chambers forming working trays which are suitable for various jobs. Preferably, two or three such working trays are provided. They can be used as trays for covering food items with egg and bread crumbs[1], or they can be used for arranging and serving salads and/or cold cuts. A projecting edge on each of at least two opposite edges of the board facilitates the holding and carrying of the household board.

[1] The German word Panieren that appears here describes a technique, used in Austrian gastronomy, in which food is covered with a mixture of bread crumbs, egg and flour. The three trays used to hold these three items are described in more detail later in the patent.

The invention is explained in more detail by means of an exemplary embodiment illustrated in the drawings in which FIG. 1 shows a top view of the cutting surface of a household board;

FIG. 2 shows a bottom view of the subdivided surface of the side of the household board opposite the cutting surface;

FIG. 3 shows a sectional view along the line A—A in FIG. 1;

Figure 4:
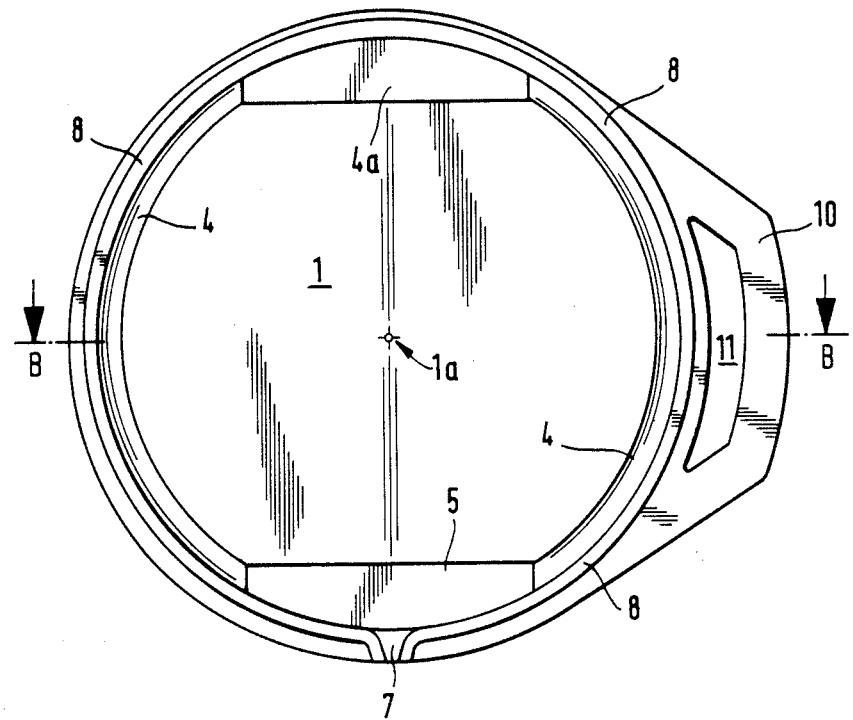
FIG. 4 shows a top view of a circular household board.

With the household board according to the invention, both surfaces of the board B are fully used and serve for convenient handling in the household.

The board B has on one side a cutting surface 1 which is bordered by a juice channel 4, 4a. The cutting surface 1 is sloped, starting from an edge 4a/1 bordering the juice channel 4a, for example, toward the opposite juice channel 4. In this way it is ensured that the juice running out from the cut roast flows over the slope of the cutting surface 1 toward the juice channel 4, which preferably is deeper than the juice channel 4a at the raised side of the cutting surface 1. The latter juice channel 4a is formed, for example, as a shallow depression and is provided for practically the sole purpose that some of the juice from the roast not possibly flow over this edge 2a of the cutting surface 1 and thus over the edge of the board B. The juice channel 4 and possibly the juice channel 4a empty into a juice-collection chamber 5, which suitably is disposed along a narrow side 3 of the board B. The bottom of this juice-collection chamber 5 is preferably also sloped, but this slope runs opposite to the slope of the cutting surface 1. The deep juice channel 4 empties at 6, i.e., at the deeper point 5a into the juice-collection chamber 5, where most of the juice can collect. In the case of a rectangular board B, the parts 4 and 4a of the juice channel are preferably disposed along the long edges 2 and 2a of the board B, while the juice-collection tray 5 is disposed along a narrow side 3. A handle 10 with a grip hole 11 is mounted on the opposite narrow side 3a of the board B. For practical reasons, along the peripheral edge of the cutting surface 1 of the board B there can be disposed an all-around ridge 8, which possibly simultaneously forms the outer wall of the juice channel 4, 4a and of the juice-collection chamber 5. This ridge 8 can be disposed at a distance from the outer edges of the board B, so that a gripping rim 9 projects, which makes it possible to grip the household board on opposite sides with the hand from below, to lift it and to carry it.

The side of the board B opposite the cutting surface 1 is divided by ribs 12, 13, 14 into chambers which, bordered by the ribs, serve as working trays 15, 16, 17. The exemplary embodiment illustrated in FIG. 2 shows three such working trays which are suitable, for example, for holding flour, beaten eggs and bread crumbs and thus for covering food items with eggs and bread crumbs. But it is also possible to arrange salads, other side dishes, sausage, etc. in these working trays and to use the household board simultaneously for serving.

The ribs 12, 13, 14, which divide the surface of the board B into chambers, can simultaneously serve as standing ribs. But there can also be provided a separate all-around ridge 18 which is at least as high or higher than the ribs 12, 13, 14 bordering the working trays 15, 16, 17. The ridge 18 is suitably located at a distance from the edges of the board B, so that a gripping rim 19 that can be grasped with the hand from below is also provided on this working side of the board B.

The number of working trays can be chosen as desired and depends on the nature of the intended use of the household board. The illustrated example shows a rectangular household board, but it can also exhibit a square, circular, oval or any other geometric shape.

Figure 5:
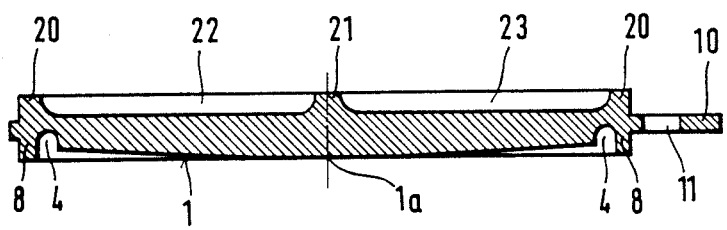
FIG. 5 shows a side view along the line B—B in FIG. 4.

Shown in FIGS. 4 and 5 is a circular household board which has the same basic features as the rectangular board per FIGS. 1 to 3.

The depth of the all-around juice channel varies, i.e., the opposite juice channels 4 are deeper than the connecting juice channel 4a on one side of these juice channels 4. The juice-collection chamber 5 with the pouring spout 7 is disposed diametrically opposite the shallower juice channel 4a.

In order to ensure the draining of the juice emerging during the cutting of a roast on this circular household board, the cutting surface 1 of this board is raised in the middle 1a and falls off slightly toward the juice channels 4—4. The side of the board opposite the cutting surface 1 is divided by ribs 20 and 21 into chambers serving as working trays 22, 23. Of course, with this board, too, there can be provided two, three or more working trays, depending on the board's size.

I claim:

1. A household board comprising a cutting surface, a working surface opposing said cutting surface, two opposing long sides and two opposing short sides, wherein said cutting surface is slightly sloped from one of the long sides to the other of the long sides and comprises a juice channel located at the periphery of the cutting surface and extending along the two sides and one of the short sides, a juice collecting chamber communicating with the juice channel and located at the periphery of the cutting surface and extending along the other of the short sides, one end of said juice collecting chamber being deeper than an opposing end thereof, and a pouring spout located at said one end of the juice collecting chamber, and wherein the working surface comprises a plurality of ribs which divide the working surface into a plurality of chambers.

2. The household board as claimed in claim 1, wherein a first portion of the juice channel extends along one of the long sides and is deeper than a second portion of the juice channel which extends along the other of the long sides, and wherein one end of the first portion of the juice channel is connected to the juice collecting chamber.

3. The household board as claimed in claim 1, further comprising a first ridge located at the periphery of the working surface which projects out from the working surface, said first ridge extending along at least the two short sides and defining a gripping rim for gripping the household board.

4. The household board as claimed in claim 3, wherein the gripping rim located along at least one of the short sides comprises a handle having a grip hole.

5. The household board as claimed in claim 3 further comprising a second ridge located at the periphery of the cutting surface which projects out from the cutting surface and opposes said first ridge, wherein said second ridge defines one wall of said juice channel and of said juice collecting chamber.

* * * * *